US012637369B2

(12) United States Patent
Shin et al.

(10) Patent No.: US 12,637,369 B2
(45) Date of Patent: May 26, 2026

(54) METHOD FOR SELECTIVELY REMOVING PERFLUORINATED COMPOUNDS WITH ELECTROOXIDATION

(71) Applicant: SK hynix Inc., Icheon-si (KR)

(72) Inventors: Hae Sol Shin, Icheon-si (KR); Hyeong Soo Kim, Icheon-si (KR); No Hyeok Park, Icheon-si (KR); Yong Je Lee, Icheon-si (KR); Nam Jong Yoo, Seongnam-si (KR); Young Hee Kim, Seongnam-si (KR)

(73) Assignee: SK hynix Inc., Icheon-si (KR)

( * ) Notice: Subject to any disclaimer, the term of this patent is extended or adjusted under 35 U.S.C. 154(b) by 613 days.

(21) Appl. No.: 18/052,896

(22) Filed: Nov. 4, 2022

(65) Prior Publication Data

US 2023/0150843 A1 May 18, 2023

(30) Foreign Application Priority Data

Nov. 17, 2021 (KR) ........................ 10-2021-0158225
Nov. 17, 2021 (KR) ........................ 10-2021-0158231

(51) Int. Cl.
*C02F 1/461* (2023.01)
*C02F 1/467* (2023.01)
*C02F 101/14* (2006.01)

(52) U.S. Cl.
CPC ...... *C02F 1/46104* (2013.01); *C02F 1/46109* (2013.01); *C02F 1/4674* (2013.01); *C02F 2001/46133* (2013.01); *C02F 2101/14* (2013.01)

(58) Field of Classification Search
USPC .......................................................... 210/748
See application file for complete search history.

(56) References Cited

U.S. PATENT DOCUMENTS

2010/0270218 A1 10/2010 Korzeniowski
2014/0008243 A1* 1/2014 Neti ........................ C02F 1/283 204/278.5
2020/0171409 A1 6/2020 Cho
2022/0402794 A1* 12/2022 Chen ........................ C02F 1/008

FOREIGN PATENT DOCUMENTS

CN 2818468 Y 9/2006
CN 101538077 A 9/2009
CN 102826632 A 12/2012
(Continued)

OTHER PUBLICATIONS

Hou Bin, Water Treatment Process Chemistry; Beijing Metallurgical Industry Press; 2015.
(Continued)

*Primary Examiner* — Hayden Brewster

(57) ABSTRACT

A device for selectively removing a perfluorinated compound may include an adsorption electrooxidation tank including a reaction unit having a plurality of electrodes and granular activated carbon configured to oxidize and decompose a perfluorinated compound in raw water through adsorption and electrooxidation, a power supply device configured to supply power to the adsorption electrooxidation tank, and a head adjustment pipe unit configured to maintain a water level within the reaction unit at a height greater than or equal to a reaction height of the electrode.

34 Claims, 10 Drawing Sheets

(56) References Cited

FOREIGN PATENT DOCUMENTS

| | | | |
|---|---|---|---|
| CN | 104261519 | A | 1/2015 |
| CN | 105293639 | A | 2/2016 |
| CN | 110342728 | A | 10/2019 |
| CN | 11875004 | A | 11/2020 |
| CN | 111875004 | A | 11/2020 |
| JP | 59127691 | A | 7/1984 |
| JP | 2010-234250 | A | 10/2010 |
| KR | 10-2006-0005023 | A | 1/2006 |
| KR | 10-2020-0074485 | A | 6/2020 |
| WO | 2012076940 | A1 | 6/2012 |
| WO | 2020247029 | A1 | 12/2020 |

OTHER PUBLICATIONS

Office Action of KR Application No. 10-2021-0158225 dated Jul. 11, 2022.
Office Action of KR Application No. 110-2021-0158231 dated Jul. 12, 2022.
Electrochemical regeneration of carbon-based adsorbents: a review of regeneration mechanisms, reactors, and future prospects.
"Sewer Facility Standard 2011". Ministry of Environment of Republic of Korea.
Extended European Search Report of EP Application No. 22206411.5, dated Feb. 24, 2023.
Wang Hongwei, He Wenzheng; Chapter II: High-Efficiency Electrocatalytic Electrode Materials; Environmental Functional Materials; Changchun: Jilin Publishing Group Co., Ltd.; pp. 23-24; ISBN 978-7-5731-0038-2; disclosed on Aug. 31, 2021.

* cited by examiner

METHOD FOR SELECTIVELY REMOVING PERFLUORINATED COMPOUNDS WITH ELECTROOXIDATION

CROSS-REFERENCE TO RELATED APPLICATION

This application claims, under 35 U.S.C. § 119, priority to and the benefit of Korean Patent Application No. 10-2021-0158225 filed on Nov. 17, 2021, and Korean Patent Application No. 10-2021-0158231 filed on Nov. 17, 2021, in the Korean Intellectual Property Office, the disclosure of which is incorporated herein by reference in its entirety.

BACKGROUND

1. Field of the Invention

This patent document relates to a device and method for selectively removing a perfluorinated compound, and more specifically, to a device and method for selectively and efficiently removing trace amounts of perfluorinated compounds contained in wastewater by adsorption electrooxidation using granular activated carbon.

2. Discussion of Related Art

Among persistent organic pollutants (POPs), perfluorinated compounds (PFCs) may collectively refer to a type of compound that has a perfluorinated ($-C_nF_{2n+1}$) tail in which hydrogen is substituted with fluorine in the basic hydrocarbon backbone structure. The perfluorinated compounds include a wide range of homologues having 4 to 15 carbons and various structures, which can change their form through decomposition and synthesis processes. Representative examples of perfluorinated compounds may include PFCAs (Perfluorocarboxylic acid, $C_nF_{2n+1}COOH$) and PFASs (Perfluoroalkylsulfonic acid, $C_nF_{2n+1}SO_2OH$).

The physicochemical characteristics of exemplary types of perfluorinated compounds are summarized in Table 1 below.

TABLE 1

| Compound | | Chemical Formula | Molecular weight (g/mol) | Solubility in water (mg/L) | pKa |
|---|---|---|---|---|---|
| PFCAs | PFHxA | $C_6HF_{11}O_2$ | 314 | — | — |
| | PFOA | $C_8HF_{15}O_2$ | 414 | 3400 | 2.5 |
| | PFNA | $C_9HF_{17}O_2$ | 464 | 9500 | 2-3 |
| PFASs | PFBS | $C_4HF_9SO_3$ | 300 | Very high | −3.94 |
| | PFHxS | $C_6HF_{13}SO_3$ | 400 | — | — |
| | PFOS | $C_8HF_{17}SO_3$ | 500 | 570 | −3.27 |

PFHxA: Perfluorohexanoic acid
PFOA: Perfluorooctanoic acid
PFNA: Perfluorononanoic acid
PFBS: Perfluorobutane sulfonic acid
PFHxS: Perfluorohexane sulfonic acid
PFOS: Perfluorooctane sulfonic acid In general, perfluorinated compounds have high chemical and thermal stability and thus not easily decomposed substances. As a result, such compounds can accumulate in the environment or in organisms over a long period of time. In addition, perfluorinated compounds are generally highly soluble in water and thus have a high possibility of movement from water discharge. Perfluorinated compounds are particularly used as a coating agent and the like and used in general industries such as clothing, electronics, and paints, so the amount of these compounds that are emitted is increasing. With such use and an increase in the discharge amounts, there is a growing awareness of the dangers of perfluorinated compounds. Currently, it is registered and managed as a drinking water monitoring item in major countries. The European Chemicals Agency (ECHA) hazard classifications and concerns for PFOS and PFOA are presented in Table 2 below.

TABLE 2

| | PFOS | PFOA |
|---|---|---|
| Hazard classification | Serious health risk, environmental pollution | Corrosive, serious health risk |
| Concerns | Carcinogenicity, reproductive toxicity | Carcinogenicity, reproductive toxicity, bioaccumulation and persistence |
| European Classification Labeling | Carcinotoxicity 2, Reproductive toxicity 1B, Long-term toxicity RE1, Acute toxicity 4, Chronic aquatic toxicity 2 | Carcinotoxicity 2, Reproductive toxicity 1B, Long-term toxicity RE1, Acute toxicity 4, Ocular damage 1 |

Perfluorinated compounds are mainly present in the water system rather than in the atmosphere, and tend to persist in soils with high organic carbon content. Recently, the harmful effects of perfluorinated compounds on the environment and health have become an issue, and research on effective treatment techniques is being conducted. However, perfluorinated compounds have structurally stable properties so there is a limit to the effectiveness of biological treatment technologies.

Perfluorinated compound removal techniques disclosed in the literature include ozone treatment, activated carbon adsorption, reverse osmosis, ion exchange, nanofiltration, membrane treatment, oxidation treatment, etc., but the removal efficiency of these techniques is not high. In addition, even in the case of technologies claiming high removal efficiency, according to the results of empirical studies, there is a limit to continuous operation, and the removal efficiency disclosed in the literature often cannot be achieved in practice. This is because the wastewater contains the perfluorinated compounds in trace amounts on the order of parts per trillion (ppt), and the efficiency of removing the perfluorinated compounds is reduced while substances having a high concentration such as total organic carbon (TOC) and ionic substances are first removed. In addition, even if a perfluorinated compound is partially decomposed, only the form may be changed and the perfluorinated compound can still remain as another type of perfluorinated compound.

In light of the above aspects, the removal of perfluorinated compounds is expected to be difficult when applying general-purpose water treatment technology because perfluorinated compounds are contained in trace amounts in complex pollutants, and biological treatments are also expected to have limited application due to the material properties of the perfluorinated compounds. In addition, processing problems for remain for concentrated materials when reverse osmosis and ion exchange techniques are used.

Accordingly, there is a need to develop a selective removal technology for perfluorinated compounds capable of continuous operation while selectively and efficiently removing only trace amounts of perfluorinated compounds from among various substances.

SUMMARY OF THE INVENTION

Embodiments of the present disclosure are directed to providing a device and method for selectively and efficiently removing trace amounts of perfluorinated compounds contained in wastewater and enabling performance of a continuous operation and process.

A device for selectively removing a perfluorinated compound according to one embodiment of the present disclosure may include: an adsorption electrooxidation tank including a reaction unit having a plurality of electrodes and granular activated carbon, configured to oxidize and decompose a perfluorinated compound in raw water through adsorption and electrooxidation; a power supply device configured to supply power to the adsorption electrooxidation tank; and a head adjustment pipe unit configured to maintain a water level within the reaction unit at a height greater than or equal to a reaction height of the electrode.

A method of selectively removing a perfluorinated compound according to still another embodiment of the present disclosure may include: oxidizing and decomposing a perfluorinated compound contained in raw water through adsorption and electrooxidation in an adsorption electrooxidation tank that includes a reaction unit having a plurality of electrodes and granular activated carbon between the electrodes; and maintaining a water level within the reaction unit at a height greater than or equal to a reaction height of the electrode by the head adjustment pipe unit.

The above-described embodiments of the present disclosure can provide a device that can increase selectivity for the perfluorinated compounds and enable a continuous operation in consideration of the characteristics of perfluorinated compounds, which can change forms, may be continuously present even when decomposed, and may exist only in trace amounts.

Accordingly, according to embodiments disclosed herein, it is possible to prevent harmful effects on the human body and the environment by selectively and efficiently removing trace amounts of perfluorinated compounds present in wastewater.

In addition, according to embodiments disclosed herein, there is no need to use a separate chemical when removing a perfluorinated compound, and the device is eco-friendly because it does not generate waste materials.

In addition, according to embodiments disclosed herein, it is possible to secure stable treatment efficiency because the granular activated carbon used for the adsorption and removal of the perfluorinated compound is electrochemically quickly reproduced, and the time needed to reach a breakthrough point can be extended when disclosed devices are used in actual industrial sites.

BRIEF DESCRIPTION OF THE DRAWINGS

The above and other objects, features and advantages of the present disclosure will become more apparent to those of ordinary skill in the art by describing in detail exemplary embodiments thereof with reference to the accompanying drawings, in which.

DETAILED DESCRIPTION OF EXEMPLARY EMBODIMENTS

Figure 1:
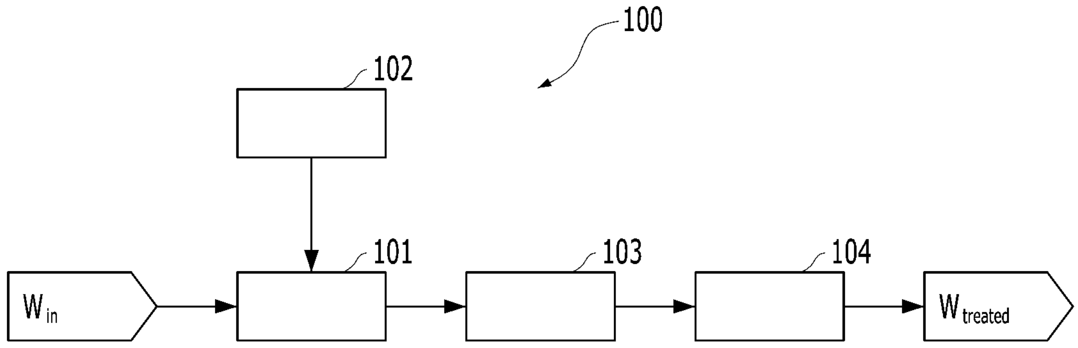
FIG. 1 is a view schematically showing a device for selectively removing a perfluorinated compound according to an embodiment of the present disclosure.

Hereinafter, various embodiments will be described in detail with reference to the accompanying drawings.

The drawings are not necessarily shown at a constant ratio, and in some examples, the proportions of at least some of structures shown in the drawings may also be exaggerated to clearly show features of the embodiments. In the following description, many specific items such as specific components are shown, which are only provided to help a more general understanding of the present invention, and it will be apparent to those skilled in the art that the present invention may be carried out even without these specific items. In addition, in describing the present invention, when it is determined that a detailed description of a related known function or configuration may unnecessarily obscure the gist of the present invention, the detailed description thereof will be omitted.

Embodiments of the disclosure relate to a device and method for selectively removing perfluorinated compound from water systems such as wastewater. In the embodiments of the present invention, a basic mechanism of the selective removal of perfluorinated compound includes oxidation and decomposition, which are simultaneously performed directly and indirectly through adsorption and electrooxidation. Additional configurations and processes together with detailed condition settings, may be added to maximize selectivity and efficiency for the removal of the perfluorinated compound.

Adsorption refers to a phenomenon in which a material present in a liquid or a gas moves to a surface of an adsorbent and is concentrated. In the embodiments disclosed herein, the adsorbent used for adsorption electrooxidation may include granular activated carbon (GAC). Because the adsorption of the perfluorinated compound by the granular activated carbon may be performed by an electrostatic attractive force and hydrophobic interaction, conditions and additional processes that may increase selectivity and efficiency for the removal of the perfluorinated compound are selected accordingly.

Since a surface of the granular activated carbon at a pH that is smaller than an isoelectric point $pH_{PZC}$ has a predominantly positive charge, it is possible to selectively adsorb perfluorinated compounds exhibiting anionic properties through electrostatic attractive forces. An adsorbed perfluorinated compound may be decomposed and removed by an oxidation process. When the pH of the solution is increased, however, the surface of the granular activated carbon becomes negatively charged, and the adsorption capacity of the granular activated carbon for an anionic material may be decreased.

The surface of the granular activated carbon does not exhibit hydrophobicity in the absence of surface hydroxyl groups, so non-polar molecules and weakly polar molecules may be adsorbed by the hydrophobic interaction. In addition, pollutants having high molecular weight or pollutants having high concentration tend to be preferentially adsorbed through hydrophobic interaction. As a result, the selective adsorption for trace amounts of perfluorinated compounds may be limited. In addition, in the case of adsorption through a hydrophobic interaction, compounds having long C—F bonds exhibit more hydrophobicity than compounds having short C—F bonds, so compounds having long C—F bonds may be easily removed by adsorption. However, surface adsorption of the perfluorinated compound having a large number of carbon atoms is not preferable for continuous operation of the device over a long period of time, the perfluorinated compound may be transformed into molecules having a smaller number of carbon atoms by applying an oxidation process together with adsorption to induce low molecular structures. Perfluorinated compounds having a smaller number of carbon atoms may have hydrophilic and anionic properties, so such perfluorinated compounds may be selectively adsorbed on the granular activated carbon by the electrostatic attractive force, and may be readily decomposed and removed by apply the oxidation process.

Embodiments of the present disclosure are based on the above-described basic mechanism. Device configuration and process steps may be designed to maximize the selectivity and efficiency for the removal of the perfluorinated compound depending on the characteristics of the perfluorinated compound and the granular activated carbon that is used an adsorbent. For example, the configuration and process steps may vary depending on the pH and suspended solid (SS) of the raw water introduced into a device for selectively removing the perfluorinated compound in consideration of the following instances:

Case 1, where the pH of the raw water is smaller than the $pH_{PZC}$ of the granular activated carbon and the SS is smaller than 500 mg/L; and Case 2, where the pH of the raw water exceeds the $pH_{PZC}$ of the granular activated carbon and the SS exceeds 500 mg/L.

In Case 1, oxidation and decomposition of the perfluorinated compound may be simultaneously performed directly and indirectly through adsorption and electrooxidation, facilitated by the prevailing positive charge on the surface of the granular activated carbon that is used as the adsorbent.

In Case 2, the high SS content of the raw water results in additional challenges. For example, the SS in untreated raw water lodges between the granular activated carbons inside the device, resulting in increased electrical resistance in the equipment, blockage of the device and interference with the movement of a fluid, all making normal operation difficult. To address these problems, equipment for additional pretreatment of the raw water before the adsorption and electrooxidation process is introduced into the device. In addition, equipment for adjusting the pH may be added, when the pH of the raw water exceeds the $pH_{PZC}$ of the granular activated carbon, so that a positive charge is induced on the surface of the granular activated carbon to selectively adsorb the perfluorinated compound by an electrostatic attractive force.

A device and method for selectively removing perfluorinated compounds in Case 1 and Case 2 will be described in detail below.

Device for Selectively Removing a Perfluorinated Compound

FIG. 1 is a view schematically showing a device for selectively removing a perfluorinated compound according to one embodiment of the present disclosure.

A device 100 for selectively removing a perfluorinated compound is shown in FIG. 1. Device 100 may be used in Case 1, in which the pH of the raw water $W_{in}$ is smaller than the $pH_{PZC}$ of the adsorbent, and the SS is smaller than 500 mg/L.

Referring to FIG. 1, the device 100 for selectively removing a perfluorinated compound may include an adsorption electrooxidation tank 101, a power supply unit 102, a head adjustment pipe unit 103, and a treatment water tank 104. A connection pipe, a valve, and/or a pump may be provided between the adsorption electrooxidation tank 101, the power supply unit 102, the head adjustment pipe unit 103, and the treatment water tank 104.

The raw water $W_{in}$ introduced into the device 100 for selectively removing the perfluorinated compound may include, but is not limited to, wastewater or any liquid medium containing the perfluorinated compounds, and preferably, trace amounts of perfluorinated compounds. Examples of the raw water $W_{in}$ may include semiconductor wastewater and other various industrial wastewater associated with the production of clothes, electronics, paints, and the like.

The perfluorinated compound contained in the raw water $W_{in}$ may be collectively referred to as compounds having a perfluorinated ($—C_nF_{2n+1}$) tail created by substituting hydrogen with fluorine in the basic hydrocarbon backbone structure. Examples may include perfluorohexanoic acid (PFHxA), perfluorooctanoic acid (PFOA), perfluorononanoic acid (PFNA), perfluorobutane sulfonic acid (PFBS), perfluorohexane sulfonic acid (PFHxS), perfluorooctane sulfonic acid (PFOS), or a combination thereof.

The concentration of the perfluorinated compound contained in the raw water $W_{in}$ need not be limited, but in general, perfluorinated compounds may be present in trace amounts, for example, at a level of parts per trillion (ppt) in the wastewater.

The raw water $W_{in}$ may be transmitted to the adsorption electrooxidation tank 101 by an introduction pump from a raw water tank (not shown).

The adsorption electrooxidation tank 101 may directly and indirectly oxidize and decompose the perfluorinated compound contained in the raw water $W_{in}$ through adsorption and electrooxidation. The adsorption electrooxidation tank 101 will be described in more detail with reference to FIGS. 2 and 3.

Figure 2:
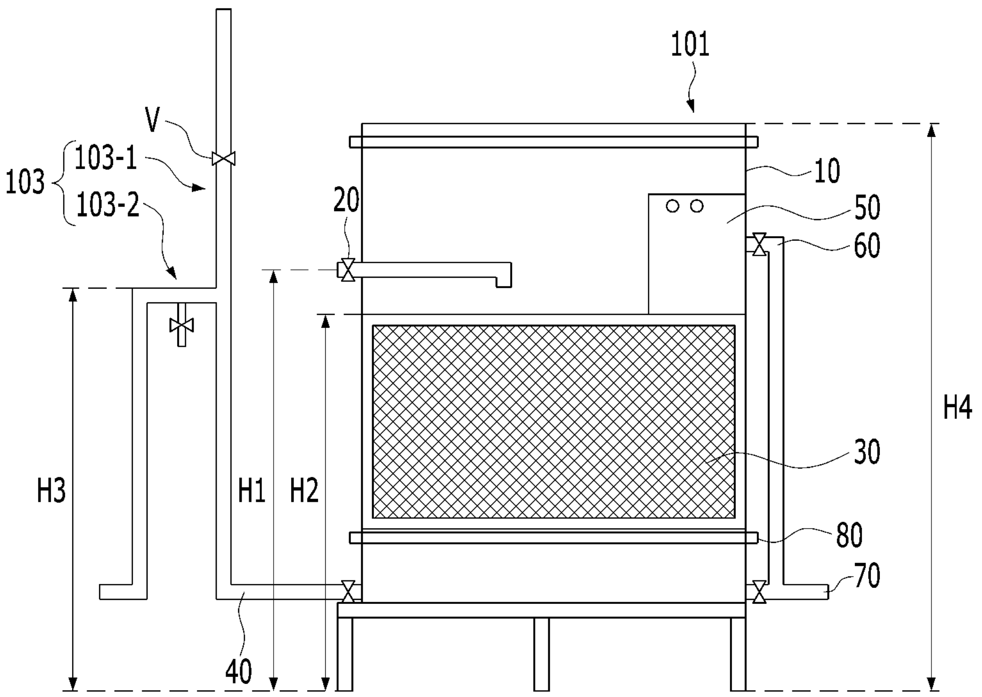
FIG. 2 is a view illustrating an adsorption electrooxidation tank and a head adjustment pipe unit included in a device for selectively removing perfluorinated compounds.

FIG. 2 is a view illustrating an adsorption electrooxidation tank and a head adjustment pipe unit included in a device for selectively removing perfluorinated compounds.

Referring to FIG. 2, an adsorption electrooxidation tank 101 may include a chamber 10, an inflow pipe 20, a reaction unit 30, an outflow pipe 40, an electrode current collection unit 50, an overflow pipe 60, a drain pipe 70, and a strainer unit 80.

In an embodiment, the raw water $W_{in}$ may be introduced into the adsorption electrooxidation tank 101 by the introduction pump installed at a front end of the adsorption electrooxidation tank 101. The raw water $W_{in}$ may be treated by gravity filtration.

In another embodiment, treated water $W_{treated}$ may also be discharged through a discharge pump installed at a rear end of the adsorption electrooxidation tank 101.

The chamber 10 may function to accommodate and support other components of the adsorption electrooxidation tank 101, and include the reaction unit 30 therein.

The inflow pipe 20 may function to introduce the raw water $W_{in}$ into the reaction unit 30. In an embodiment, the inflow pipe 20 may be formed above the reaction unit 30 and the raw water $W_{in}$ may flow unassisted into the reaction unit 30. The water level in the reaction unit 30 may be maintained by a head adjustment pipe unit 103.

After the reaction is completed, the outflow pipe 40 may function to discharge the treated water from the reaction unit 30. The outflow pipe 40 may be connected to the head adjustment pipe unit 103.

The electrode current collection unit 50 may be connected to a DC power supply and may be configured to supply DC power to the adsorption electrooxidation tank 101, and may also function as a buffer for accommodating the liquid in the reaction unit 30 when the liquid in the reaction unit 30 overflows. For example, the electrode current collection unit 50 may supply the DC power by bridge-connecting electrodes having the same polarity, using two bolts and nuts, and then connecting the electrodes to the DC power supply.

The overflow pipe 60 may function to transmit overflow surplus liquid to the drain pipe 70.

The drain pipe 70 may function to discharge the surplus liquid when the operation is terminated or when the activated carbon needs to be replaced.

The strainer unit 80 includes exterior and interior elements. The exterior element may function to provide structural reinforcement, and the interior element may function to prevent the granular activated carbon 32 (see FIG. 3) in the reaction unit 30 from being introduced into a lower portion of the chamber 10.

The reaction unit 30 may function to oxidize and decompose the perfluorinated compound contained in the raw water $W_{in}$ through adsorption and electrooxidation, and may function to reproduce the granular activated carbon 32 that is a conductive media. The reaction unit 30 will be described in detail with reference to FIG. 3.

Figure 3:
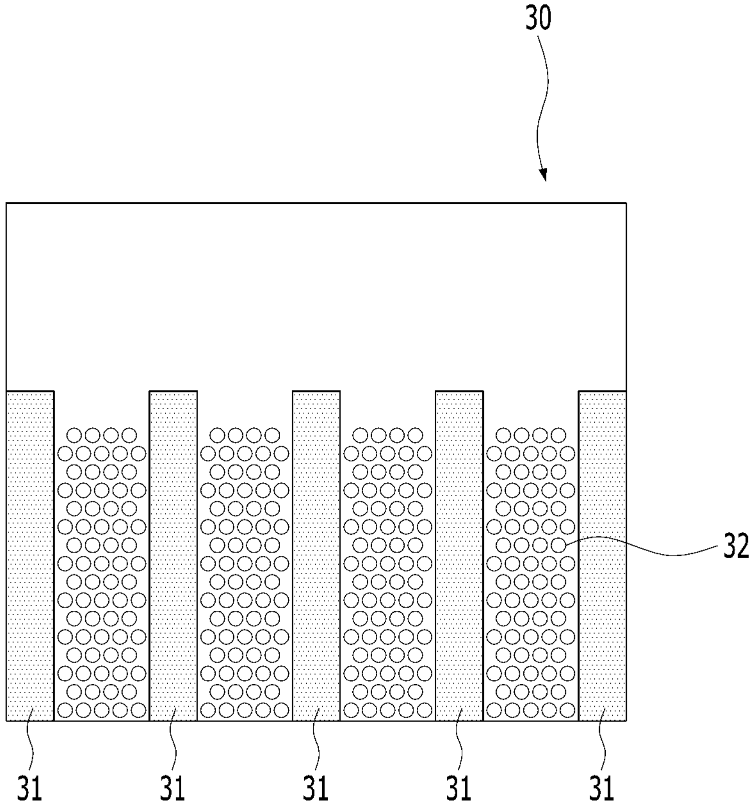
FIG. 3 is a view illustrating a reaction unit of an adsorption electrooxidation tank shown in FIG. 2.

FIG. 3 is a view illustrating a reaction unit of an adsorption electrooxidation tank shown in FIG. 2. Referring to FIG. 3, a reaction unit 30 may include an electrode 31 and granular activated carbon 32, which fills in spaces between the electrodes 31.

As the raw water $W_{in}$ introduced into the reaction unit 30 passes through the filled granular activated carbon 32, the perfluorinated compound contained in the raw water $W_{in}$ may be adsorbed to the granular activated carbon 32. The adsorption to the granular activated carbon 32 may be performed by an electrostatic attractive force and/or hydrophobic interaction. The perfluorinated compound adsorbed to the surface of the granular activated carbon 32 may also be distributed into pores formed inside the granular activated carbon 32 by a screening action. The perfluorinated compound adsorbed to the granular activated carbon 32 by radicals generated from the electrode 31 by an electric current supplied by the power supply unit 102 (see FIG. 1) may be decomposed into inorganic material or into a compound with a lower molecular weight. A perfluorinated compound decomposed into a compound with a lower molecular weight may be further decomposed into inorganic material through repeated adsorption, oxidation and decomposition. Finally, the decomposed products may be discharged in the form of a gas. The decomposed product may be discharged through an outlet (not shown) provided in a lid portion of the adsorption electrooxidation tank 101, or may also be discharged by connecting a pipe (not shown) after perforating the lid portion. In addition, the granular activated carbon 32 may be reproduced simultaneously with the oxidation and decomposition of the perfluorinated compound. Accordingly, in the reaction unit 30, the adsorption and decomposition of the perfluorinated compound may be continuously performed.

A general electrooxidation process requires a large electrode surface area because oxidation occurs only on a surface of a positive electrode. However, in the embodiments of the present disclosure, the granular activated carbon 32, which is the conductive medium between the electrodes 31, is polarized to form a microelectrode under the influence of an electric field applied at an appropriate voltage. Consequently, electrooxidation and decomposition may be performed on the surface of each granule of the granular activated carbon 32. Accordingly, it is possible to secure a remarkably increased electrooxidation reaction area compared to a general electrooxidation process, thereby increasing the removal efficiency of the perfluorinated compound.

In addition, when the electrical conductivity in the raw water $W_{in}$ is low, the general electrooxidation process requires the input of additional chemicals to secure conductivity. However, in the embodiments of the present disclosure, it is possible to secure the conductivity required for electrooxidation and decomposition without additional chemicals by using the granular activated carbon 32 as the conductive medium used to fill between the electrodes 31.

In addition, as described above, the granular activated carbon 32 may be quickly reproduced at the same time as the perfluorinated compound is adsorbed to the granular activated carbon 32, electrically oxidized and decomposed, so it is possible to delay, in time, the breakthrough point as compared to a general adsorption process. This secures stable treatment efficiency for newly introduced perfluorinated compounds. The breakthrough point refers to a point in time at which the adsorbent reaches an upper limit for adsorbing materials and removing adsorbed materials, and may generally refer to a time point when a discharged concentration reaches 5 to 10% of an introduced concentration. In embodiments, timing of a substitution cycle of the granular activated carbon, which may ensure removal performance of the perfluorinated compound, may be increased by high reproduction efficiency of the granular activated carbon 32, thereby increasing cost effectiveness and enabling an effective application for large-scale processes.

In an embodiment, the electrode 31 and the granular activated carbon 32 are characterized by being selected and combined to exhibit an optimized selectivity and efficient adsorption oxidation removal effect for a perfluorinated compound. In other words, the granular activated carbon 32 may increase a contact time for the electro-oxidation of the perfluorinated compound because it has a large specific surface area. In addition, in order to supplement a relatively low electrical conductivity of the granular activated carbon 32, the electrode 31 may be formed in a multi-electrode structure, and in addition, may be formed as a dimensionally stable anode (DSA) electrode in order to increase a lifetime and efficiency of the electrode 31.

The granular activated carbon 32 included in the reaction unit 30 may function as the conductive medium for adsorption electrooxidation, and the adsorption, oxidation, and decomposition of the perfluorinated compound may be performed in the granular activated carbon 32. In other words, in order to selectively and efficiently remove the perfluorinated compound, the granular activated carbon 32 is characterized by being used as the conductive medium of the adsorption electrooxidation comprehensively in consideration of all of the following: characteristics of the perfluorinated compound itself; a point in which trace amounts of perfluorinated compounds are contained in wastewater; the method of removing the perfluorinated compound; the specific surface area of the granular activated carbon 32; catalytic activity of the granular activated carbon 32; and stability of the conductive medium, as non-limiting examples.

According to embodiments of the disclosure, the granular activated carbon 32 may include some or all commercially available granular activated carbon 32 products or manufacturable granular activated carbon materials. The granular activated carbon 32 is a granular porous carbon, and with innumerable pores of 1 nm to 10 μm therein. A pore may be classified into a micropore (pore having a diameter of 20 Å or less), a mesopore (pore having a diameter of 20 to 1000 Å), and a macropore (pore having a diameter of 1000 Å) according to its size.

The granular activated carbon 32 may be manufactured by activating a carbonaceous raw material. Examples of the raw material of the granular activated carbon 32 may include, but are not limited to, vegetable-based materials such as coconut shell, wood, sawdust, and charcoal, coal-based materials such as soft coal, anthracite, peat, lignite, brown coal, and bituminous coal, petroleum-based materials such as petroleum residue, sulfuric acid sludge, and oil carbon, or combinations thereof. Examples of the activation method may include, but are not limited to, a gas activation method, a chemical activation method, a chemical gas combination activation method, and the like.

An example of detailed characteristics of the granular activated carbon 32 is shown in Table 3 below. However, the characteristics of the granular activated carbon 32 that may be used in embodiment of this disclosure are not limited thereto.

TABLE 3

| Characteristics | |
|---|---|
| Filled density (g/cc) | 0.35-0.55 |
| Electrical conductivity ($\Omega^{-1}$ $cm^{-1}$) | 0.01-0.2 |
| Size (mesh) | 4-30 |
| Hardness (%) | 85% or more |
| Drying loss rate (%) | 0.5-6 |
| Isoelectric point ($pH_{PZC}$) | 4-10 |
| Specific surface area ($m^2$/g) | 650-1500 |
| Iodine adsorption force (mg/g) | 850-1200 |

The granular activated carbon 32 may be quickly reproduced as the adsorbed perfluorinated compound is electro-oxidized, so that the breakthrough time is delayed and stable treatment efficiency may be exhibited for any newly introduced perfluorinated compound.

The electrode 31 included in the reaction unit 30 may be subjected to adsorption electrooxidation by supplying an appropriate voltage. In disclosed embodiments, in order to selectively and efficiently remove the perfluorinated compound, the electrode 31 is designed with a specific structure and material to address all of the characteristics of the perfluorinated compound itself, the point in which trace amounts of the perfluorinated compounds are contained in wastewater, the method of removing the perfluorinated compound, an electrocatalytic activity, service life, and stability of the electrode 31, and the like.

The general electrooxidation process has an electrode structure in which a negative electrode and a positive electrode are disposed on opposite sides or ends. On the other hand, in other embodiments, the electrode 31 may have a multi-electrode structure. The multi-electrode structure may be a structure in which the positive electrode and the negative electrode are alternately disposed. For example, the electrode 31 having three electrodes may have a positive electrode-negative electrode-positive electrode structure, and the electrode 31 having five electrodes may have a positive electrode-negative electrode-positive electrode-negative electrode-positive electrode structure. As described above, the electrode 31 has the multi-electrode structure, so that it is possible to improve the operational characteristics of the device such as electrocatalytic activity, service life, and stability, thereby further increasing the efficiency of the adsorption electrooxidation.

The positive electrode and negative electrode included in the electrode 31 may include the same material in order to increase efficiency upon operation.

In an embodiment, one or more separators (not shown) may be further formed between the electrodes 31. The separator may physically separate the granular activated carbon 32 each other filled between the electrodes 31.

In an embodiment, the electrode 31 may include a dimensionally stable anode (DSA). As described above, it is possible to further improve the selectivity and efficient removal of the perfluorinated compounds using a DSA as the electrode 31.

The DSA electrode refers to an oxidation electrode that is physically, thermally and electrochemically stable. The DSA electrode has a relatively low potential for $O_2$ evolution ($V_{OER}$) and a longer life. The DSA electrode has excellent physical, thermal, and electrochemical stability, and is used as a chlorine generating electrode in a chlor-alkali process based on the characteristic of its low $V_{OER}$. Most of the DSA electrodes may be manufactured using a method of coating a transition metal on a Ti substrate, and Ru, Ir, Ta, Pb, Sn, Pt, or the like may be used as a coating transition metal material. In particular, $IrO_2$ having good stability and $RuO_2$ having good reactivity are used. As most of the electrode manufacturing methods, a method of using a pyrolysis method by coating a precursor on a substrate has been reported, and recently, an ionic liquid (IL) method, a Pechini method, an electrodeposition method, and the like have been reported.

According to embodiments of the disclosure, the DSA used as the electrode 31 may include all commercially available DSA electrodes or all manufacturable DSA electrodes.

Referring back to FIG. 2, the head adjustment pipe unit 103 will be described.

The head adjustment pipe unit 103 may function to allow the liquid to maintain a level that is greater than or equal to a reaction height of the electrode 31 in the reaction unit 30 while device 100 is operating to selectively remove the perfluorinated compound, and to transmit the liquid whose reaction has been completed to the treatment water tank 104.

In this specification, the reaction height of the electrode 31 may be used interchangeably with a reaction area of the electrode 31, and may refer to a region where the perfluorinated compound adsorbed to the granular activated carbon 32 may be decomposed and removed by the oxidation reaction on the electrode 31. As used herein, the term "reaction height of the electrodes" refers to a vertical extent of each electrode (31) that is immersed in the water within the reaction unit (30) and actually participates in electrooxidation of perfluorinated compounds. The reaction height is defined by the portion of the electrode surface area that is in contact with the water and contributes to the electrochemical reaction, and may vary depending on operating conditions such as flow rate, voltage/current density, and electrode arrangement.

The head adjustment pipe part 103 may include a first portion 103-1 and a second portion 103-2.

The first portion 103-1 may be vertically disposed, may have a lower end connected orthogonally to the outflow pipe 40, extending in a horizontal direction, of the adsorption electrooxidation tank 101, and may have a valve V configured to allow air to pass therein. It is possible to allow the liquid to maintain the water level greater than or equal to the reaction height of the electrode 31 in the reaction unit 30 by opening the valve V and using atmospheric pressure while the adsorption electrooxidation tank 101 is being operated.

A height of the first portion 103-1 of the head adjustment pipe unit 103 may be set to be greater than or equal to a height H4 of the adsorption electrooxidation tank 101 in order to prevent the liquid from overflowing.

The second portion 103-2 may have a bent shape, with one end connected orthogonally to the first portion 103-1 to extend horizontally away from the outflow pipe 40 at a predetermined height H3. The other end of the second portion 103-2 is connected to the treatment water tank 104, which may be at the same level as the outflow pipe 40.

A height H3 of the second portion 103-2 of the head adjustment pipe unit 103 should be designed in consideration of a head difference with the inflow pipe 20 so that the liquid may pass by gravity, and should also be designed to maintain a water level that is greater than or equal to the reaction height (reaction area) of the electrode 31 in the reaction unit 30. Accordingly, the height H3 of the second portion 103-2 of the head adjustment pipe unit 103 may be set to a range that is greater than or equal to the height H2 of the reaction unit 30 and smaller than or equal to the height H1 of the inflow pipe 20. Here, each of the heights H1, H2, H3, and H4 may be based on a bottom surface on which the device 100 for selectively removing the perfluorinated compound is installed.

Referring back to FIG. 1, the power supply unit 102 will be described.

The power supply unit 102 may function to supply power for operating the adsorption electrooxidation tank 101.

Power and current density conditions for operating the adsorption electrooxidation tank 101 should be set to optimize the adsorption electrooxidation of the perfluorinated compound. The granular activated carbon 32 included in the reaction unit 30 is polarized by an electric field formed by applying an appropriate voltage to form microelectrodes, so that an electrooxidation reaction may be performed on the surface of each granular activated carbon 32 particle. Specific power and current density conditions may be appropriately selected according to a material and structure of the electrode 31, the characteristics of the granular activated carbon 32, a flow rate of the introduced raw water $W_{in}$, a residence time, and the like.

In an embodiment, the adsorption electrooxidation tank 101 may be operated under conditions of a voltage of 7 to 12 V and a current density of 1 to 2.5 $mA/cm^2$ so as to optimize the adsorption electrooxidation of perfluorinated compound. The present inventors have researched examples and results provide operation conditions that exhibit the optimal effect in order to selectively and efficiently remove the perfluorinated compound in consideration of the characteristics of the perfluorinated compound.

The treatment water tank 104 may function to receive and accommodate the liquid, from the head adjustment pipe unit 103, whose adsorption electrooxidation reaction has been completed in the adsorption electrooxidation tank 101.

The treated water $W_{treated}$ may be discharged from the treated water tank 104 to the outside.

According to a device 100 for selectively removing the perfluorinated compound according to disclosed embodiments, it is possible to simultaneously perform the oxidation and decomposition of the perfluorinated compound directly and indirectly through adsorption and electrooxidation, thereby selectively and efficiently removing the perfluorinated compound. In addition, according to the device 100 for selectively removing the perfluorinated compound, it is possible to selectively treat the perfluorinated compound without the input of a separate chemical, and it is possible to delay the breakthrough point and exhibit stable treatment efficiency as the granular activated carbon 32 is continuously reproduced.

Next, a device for selectively removing a perfluorinated compound will be described with reference to FIG. 4.

Figure 4:
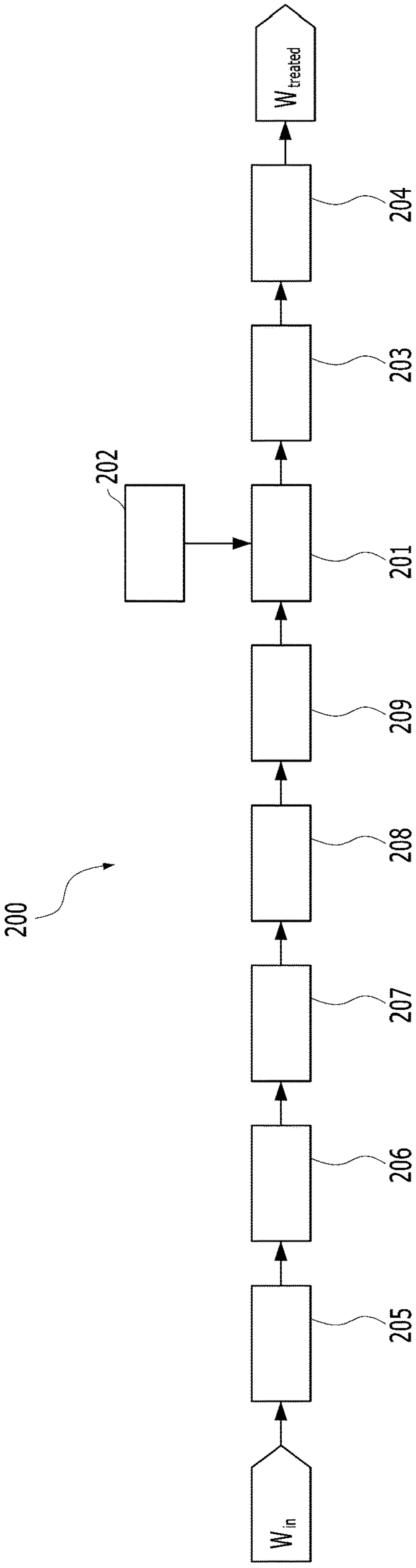
FIG. 4 is a view schematically showing a device for selectively removing a perfluorinated compound according to another embodiment of the present disclosure.

FIG. 4 is a view schematically showing a device for selectively removing a perfluorinated compound according to another embodiment of the present disclosure. A device 200 for selectively removing a perfluorinated compound shown in FIG. 4 may be used in the above-described Case 2, in which the pH of the raw water $W_{in}$ exceeds the $pH_{PZC}$ of the adsorbent and the SS exceeds 500 mg/L. The embodiment illustrated in FIG. 4 is different from the embodiment illustrated in FIGS. 1 to 3 in that it includes equipment for additional pretreatment before the adsorption and electrooxidation processes. Below, a detailed description of the contents described in relation to the embodiment shown in FIGS. 1 to 3 will be omitted where duplicative of the embodiment shown in FIG. 4 to avoid repetition.

The additional pretreatment may include one or more selected from a group consisting of coagulation, precipitation, filtration, and pH adjustment.

Referring to FIG. 4, the device 200 for selectively removing the perfluorinated compound may include a coagulation tank 205, a precipitation tank 206, a primary treatment water tank 207, a filtration tank 208, a pH adjustment tank 209, an adsorption electrooxidation tank 201, a power supply unit 202, a head adjustment pipe unit 203, and a secondary treatment water tank 204. A connection pipe, a valve, and/or a pump may be provided between the coagulation tank 205, the precipitation tank 206, the primary treatment water tank 207, the filtration tank 208, the pH adjustment tank 209, the adsorption electrooxidation tank 201, the power supply unit 202, the head adjustment pipe unit 203, and the secondary treatment water tank 204.

The raw water $W_{in}$ may be transmitted from a raw water tank (not shown) to the coagulation tank 205 by an inlet pump.

The coagulation tank 205 may function to coagulate the SS in order to prevent blockage of the adsorption electrooxidation tank 201 with the high content of SS contained in the raw water $W_{in}$.

A coagulation reaction in the coagulation tank 205 may be performed using a coagulant. Preferably, the coagulant may include an aluminum-based coagulant, a polymer coagulant, or a combination thereof.

Examples of the aluminum-based coagulant may include poly aluminum chloride (PACI), alum, or a combination thereof.

The polymer coagulant may be classified into a low degree of polymerization and a high degree of polymerization according to the molecular weight, and each may be classified into cationic, anionic, and nonionic polymer coagulants. Examples of the polymer coagulant may include water-soluble polymer, polyacrylic acid, polyacrylamide, polyvinyl alcohol, or a combination thereof.

In this embodiment, the aluminum-based coagulant and the polymer coagulant may be used by being appropriately selected from commercially available products.

The precipitation tank 206 may function to precipitate agglomerates agglomerated in the coagulation tank 205.

For example, the precipitation tank 206 may use an inclined plate to minimize a site area, and its area may be set so that a surface loading rate is adjusted to from 40 m/hr to 60 m/hr.

The primary treatment water tank 207 may function to receive the primary treated water after coagulation and precipitation reactions.

The filtration tank 208 may function to filter the agglomerates precipitated from the primary treated water. The primary treated water may be transmitted from the primary treatment water tank 207 to the filtration tank 208 by a transport pump.

Filtration performed in the filtration tank 208 may be used by selecting an appropriate method according to process conditions or the like among various known filtration methods.

The pH adjustment tank 209 may function to adjust the pH of the primary treated water passing through the filtration tank 208 to a predetermined range. The pH of the primary treated water in the pH adjustment tank 209 may be adjusted to a range of pH 6.5 to 8 for the efficiency of the adsorption electrooxidation, which is a subsequent process. The adjustment of the pH may be performed using an appropriate pH adjuster according to the pH of the primary treated water.

In an embodiment, when the pH of the primary treated water passing through the filtration tank 208 is within the above range, the primary treated water does not pass through the pH adjustment tank 209.

Subsequently, the adsorption electrooxidation reaction of the perfluorinated compound may be performed in the adsorption electrooxidation tank 201, and oxidation and decomposition may be simultaneously performed directly and indirectly through the adsorption and electrooxidation of the perfluorinated compound. In addition, the granular activated carbon 32 (see FIG. 3) may be reproduced together with the adsorption electrooxidation of the perfluorinated compound, thereby exhibiting stable treatment efficiency.

The adsorption electrooxidation tank 201, the power supply unit 202, the head adjustment pipe unit 203, and the secondary treatment water tank 204 may correspond to the adsorption electrooxidation tank 101, the power supply unit 102, the head adjustment pipe unit 103, and the treatment water tank 104 described above with reference to FIGS. 1 to 3.

In the embodiment illustrated by FIG. 4, a pretreatment tank for pretreatment of the raw water $W_{in}$ includes the coagulation tank 205, the precipitation tank 206, the primary treatment water tank 207, the filtration tank 208, and the pH adjustment tank 209, but in other embodiments, may selectively include one or more selected from the coagulation tank 205, the precipitation tank 206, the primary treatment water tank 207, the filtration tank 208, and the pH adjustment tank 209.

According to the device 200 for selectively removing the perfluorinated compound according to an embodiment, it is possible to simultaneously perform the oxidation and decomposition of the perfluorinated compound directly and indirectly through adsorption and electrooxidation, thereby selectively and efficiently removing the perfluorinated compound. In addition, according to the device 200 for selectively removing the perfluorinated compound according to an embodiment, when the SS content of the raw water is high and the pH exceeds the $pH_{PZC}$ of the adsorbent, it is possible to prevent the blockage of the device by performing specific pretreatments to further increase the selectivity and efficiency of the adsorption electrooxidation of the perfluorinated compound. In addition, according to the device 200 for selectively removing the perfluorinated compound according to an embodiment, it is possible to selectively treat the perfluorinated compound without the use of an additional chemical, and to delay the breakthrough point and exhibit stable treatment efficiency as the granular activated carbon 32 is continuously reproduced.

Method of Selectively Removing Perfluorinated Compound

Next, a method of selectively removing a perfluorinated compound according to an embodiment of the present disclosure will be described in detail below. The method of selectively removing the perfluorinated compound may be applied to each of the above-described Case 1 and Case 2, and to the use of the devices 100 and 200 for selectively removing the perfluorinated compound.

Figure 5:
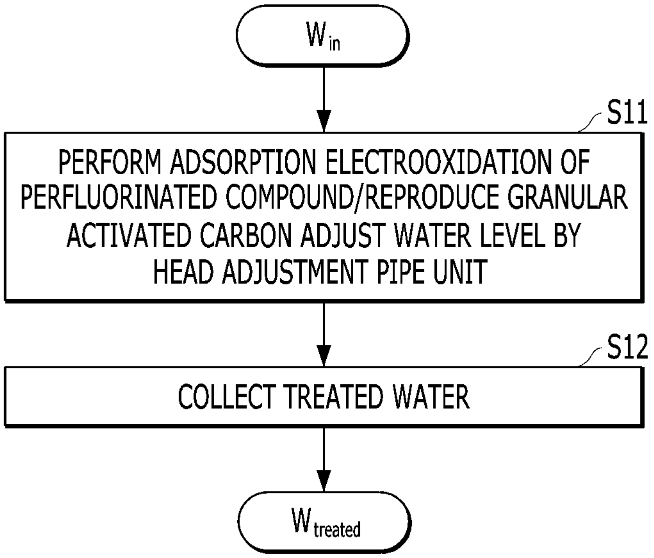
FIG. 5 is a view schematically showing a method of selectively removing a perfluorinated compound according to one embodiment of the present disclosure.

FIG. 5 is a view schematically showing a method of selectively removing a perfluorinated compound according to an embodiment of the present disclosure.

The method of selectively removing the perfluorinated compound shown in FIG. 5 will be described for Case 1, that is, the case in which the pH of the raw water $W_{in}$ is smaller than the $pH_{PZC}$ of the adsorbent and the SS is smaller than 500 mg/L.

Referring to FIG. 5, a method of selectively removing the perfluorinated compound according to an embodiment of the present disclosure may include an operation of performing adsorption electrooxidation of the perfluorinated compound and reproducing granular activated carbon (S11) and an operation of collecting treated water (S12).

In the operation of performing the adsorption electrooxidation of the perfluorinated compound and reproducing the granular activated carbon (S11), the perfluorinated compound may be directly and indirectly oxidized and decomposed from the raw water $W_{in}$ through the adsorption electrooxidation, and at the same time, the granular activated carbon may be reproduced.

The operation of performing the adsorption electrooxidation of the perfluorinated compound and reproducing the granular activated carbon (S11) may be performed in an adsorption electrooxidation tank including a plurality of electrodes and a reaction unit including granular activated carbon between the electrodes. The granular activated carbon is polarized by an electric field to form microelectrodes, so that the perfluorinated compound adsorbed to a surface of the granular activated carbon may be oxidized and decomposed. At this time, the adsorption electrooxidation reaction may be performed by accompanying a water level adjustment process by a head adjustment pipe unit.

The operation of performing the adsorption electrooxidation of the perfluorinated compound and reproducing the granular activated carbon (S11) may further include: an operation of introducing the raw water into the reaction unit through an inflow pipe disposed above the reaction unit; and an operation of discharging the treated water whose reaction has been completed in the reaction unit through an outflow pipe disposed under the reaction unit.

An operation of maintaining the water level in the reaction unit at a height greater than or equal to a reaction height of the electrode by the head adjustment pipe unit may be performed by the head adjustment pipe unit, which includes a first portion and a second portion. The first portion may be vertically disposed, may have a lower end connected orthogonally to the outflow pipe, and include a valve that may allow air to pass therethrough from an upper end thereof. The second portion may have a bent shape, have one end connected orthogonally to the first portion at a predetermined height, and have the other end disposed at the same level as the outflow pipe.

While the adsorption electrooxidation tank is operated, the water level within the reaction unit may be maintained using atmospheric pressure by opening the valve of the first portion.

The operation of maintaining the water level in the reaction unit at the height greater than or equal to the reaction height of the electrode by the head adjustment pipe unit may include maintaining the height of the head adjustment pipe unit at a height greater than or equal to the height of the adsorption electrooxidation tank.

The operation of maintaining the water level in the reaction unit at a height greater than or equal to the reaction height of the electrode with the head adjustment pipe unit may include maintaining a height of the second portion of the head adjustment pipe unit within a range that is greater than or equal to the height of the reaction unit and smaller than or equal to a height of the inflow pipe.

In this specification, the reaction height of the electrode may be used interchangeably with a reaction area of the electrode, and may refer to a region where the perfluorinated compound adsorbed to the granular activated carbon may be decomposed and removed by the oxidation reaction on the electrode.

The operation of performing the adsorption electrooxidation of the perfluorinated compound and reproducing the granular activated carbon (S11) may further include an operation of supplying power by a power supply device.

In the method of selectively removing the perfluorinated compound according to an embodiment of the present disclosure, the operation of performing the adsorption electrooxidation of the perfluorinated compound and reproducing the granular activated carbon (S11) may be performed using operation voltage of 7 to 12 V and a providing a current density of 1 to 2.5 $mA/cm^2$. The operation conditions are set to optimize for the selection and efficient removal of the perfluorinated compound.

The method of selectively removing the perfluorinated compound according to an embodiment of the present disclosure may exhibit a removal rate of 99% or more with respect to the perfluorinated compound when a relative flow rate of 2,000 times or more is processed with respect to a volume of the granular activated carbon.

In the collecting of the treated water (S12), the treated water from which the perfluorinated compound is removed by adsorption electrooxidation in of the perfluorinated compound and reproduction of the granular activated carbon (S11) may be collected.

In an embodiment, the raw water $W_{in}$ to be treated may include, but is not limited to, wastewater or any liquid medium containing the perfluorinated compounds, preferably, trace amounts of perfluorinated compounds. Examples of the raw water $W_{in}$ may include semiconductor wastewater, various other industrial wastewater (i.e., wastewater from processing clothes, electronics, paints, and the like), purified water, sewage, and the like.

The perfluorinated compound contained in the raw water $W_{in}$ may be collectively referred to as compounds having a perfluorinated ($—C_nF_{2n+1}$) tail by substituting hydrogen with fluorine in the basic hydrocarbon backbone structure. Examples may include perfluorohexanoic acid (PFHxA), perfluorooctanoic acid (PFOA), perfluorononanoic acid (PFNA), perfluorobutane sulfonic acid (PFBS), perfluorohexane sulfonic acid (PFHxS), perfluorooctane sulfonic acid (PFOS), or a combination thereof.

A concentration of the perfluorinated compound contained in the raw water $W_{in}$ is not limited to any particular amount, but in general, the perfluorinated compounds may be present in trace amounts, for example, at a level of parts per trillion (ppt) in the wastewater.

The method of selectively removing the perfluorinated compound may be performed by a device 100 for selectively removing the perfluorinated compound as shown in FIG. 1. Since the device 100 for selectively removing the perfluorinated compound has been described above in detail with reference to FIGS. 1 to 3, a detailed description of device 100 will be omitted here.

According to the method of selectively removing the perfluorinated compound, it is possible to simultaneously perform the oxidation and decomposition of the perfluorinated compound directly and indirectly through adsorption and electrooxidation, thereby selectively and efficiently removing the perfluorinated compound. In addition, according to the method of selectively removing the perfluorinated compound according to this embodiment, it is possible to selectively treat the perfluorinated compound without using a separate and additional chemical, and it is possible to delay the breakthrough point while providing stable treatment efficiency with continuously reproduced granular activated carbon 32.

Next, a method for selectively removing a perfluorinated compound will be described with reference to FIG. 6.

Figure 6:
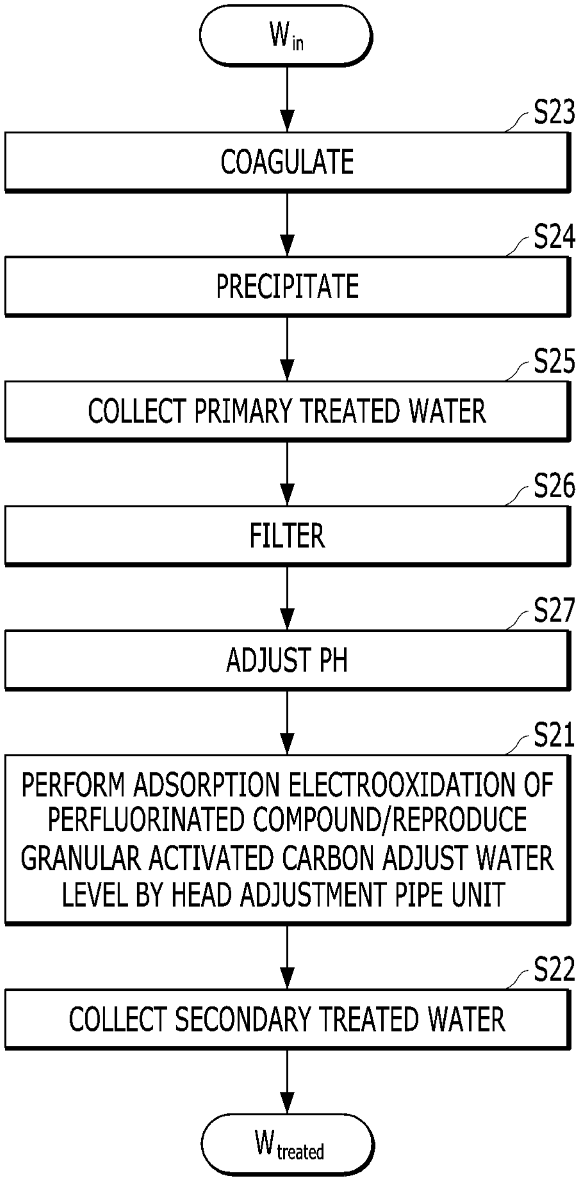
FIG. 6 is a view schematically showing a method of selectively removing a perfluorinated compound according to another embodiment of the present disclosure.

FIG. 6 is a view schematically showing a method of selectively removing a perfluorinated compound according to another embodiment of the present disclosure. This method may be used in the above-described Case 2, in which the pH of the raw water $W_{in}$ exceeds the $pH_{PZC}$ of the adsorbent and the SS exceeds 500 mg/L. The embodiment shown in FIG. 6 is different from the embodiment shown in FIG. 5 in that an additional pretreatment process is further included before the adsorption and electrooxidation process. The additional pretreatment may include one or more selected from a group consisting of coagulation, precipitation, filtration, and pH adjustment.

In the embodiment shown in FIG. 6, the additional pretreatment includes coagulation, precipitation, filtration, and pH adjustment operations, but other embodiments may selectively include one or more selected from the agglomeration, precipitation, filtration, and pH adjustment operations.

The method of selectively removing the perfluorinated compound according to this embodiment may include a coagulation operation (S23), a precipitation operation (S24), an operation of collecting the primary treated water (S25), a filtration operation (S26), a pH adjustment operation (S27), an operation of performing adsorption electrooxidation of a perfluorinated compound (S21), and an operation of collecting secondary treatment water (S22).

In the coagulation operation (S23), SS may be coagulated to prevent blockage of an adsorption electrooxidation tank 201 by the high content of SS contained in the raw water $W_{in}$.

The coagulation operation (S23) may be performed using a coagulant such as an aluminum-based coagulant, a polymer coagulant, or a combination thereof.

In the precipitation operation (S24), the agglomerates agglomerated in the agglomeration operation (S23) may be precipitated.

The precipitation operation (S24) may be performed using an inclined plate. For example, the precipitation operation may be performed using an inclined plate having the area set so that a surface loading rate is adjusted to a rate between 40 m/hr to 60 m/hr, inclusive.

In the operation of collecting the primary treated water (S25), the primary treated water in which the agglomeration and precipitation reactions have been performed may be collected.

In the filtration operation (S26), the agglomerates precipitated from the primary treated water collected in the operation of collecting the primary treated water (S25) may be filtered.

The filtration operation (S26) may be performed by selecting an appropriate method from among various known filtration methods in the art.

In the pH adjustment operation (S27), the pH of the primary treated water filtered in the filtration operation (S26) may be adjusted to a predetermined range. In the pH adjustment operation (S27), the pH of the primary treated water may be adjusted to between a range of pH 6.5 to 8, inclusive, for the efficiency of the subsequent adsorption electrooxidation process. The adjustment of the pH may be performed using an appropriate pH adjuster based on the pH of the primary treated water.

In an embodiment, when the pH of the primary treated water filtered in the filtration operation (S26) is within the above range, the pH adjustment operation (S27) may be omitted.

The operation of performing the adsorption electrooxidation of the perfluorinated compound and reproducing granular activated carbon (S21) may be performed in the adsorption electrooxidation tank that includes a plurality of electrodes and a reaction unit that includes granular activated carbon between the electrodes. The granular activated carbon is polarized by an electric field to form microelectrodes, so that the perfluorinated compound adsorbed to the surface of each granular activated carbon may be oxidized and decomposed. The adsorption electrooxidation reaction may accompanied by a water level adjustment process using a head adjustment pipe unit.

The operation of performing the adsorption electrooxidation of the perfluorinated compound and reproducing the granular activated carbon (S21) may further include: an operation of introducing the raw water into the reaction unit through an inflow pipe disposed above the reaction unit; and an operation of discharging the treated water after completing reactions in the reaction unit through an outflow pipe disposed under the reaction unit.

An operation of maintaining the water level in the reaction unit at a height greater than or equal to the reaction height of the electrode, using the head adjustment pipe unit, may be performed. The head adjustment pipe unit includes a first portion and a second portion. The first portion may be vertically disposed, may have a lower end connected orthogonally to the outflow pipe, and include a valve that may allow air to pass therethrough from an upper end thereof. The second portion may have a bent shape, have one end connected orthogonally to the first portion at a predetermined height and have the other end disposed at the same level as the outflow pipe.

During the operation of the adsorption electrooxidation tank, the water level within the reaction unit may be maintained using atmospheric pressure by opening the valve of the first portion.

The operation of maintaining the water level in the reaction unit at a height greater than or equal to the reaction height of the electrode may include maintaining the height of the head adjustment pipe unit at a height greater than or equal to a height of the adsorption electrooxidation tank.

The operation of maintaining the water level in the reaction unit at a height greater than or equal to the reaction height of the electrode may include maintaining a height of the second portion of the head adjustment pipe unit in a range that is greater than or equal to a height of the reaction unit and smaller than or equal to a height of the inflow pipe.

The operation of performing the adsorption electrooxidation of the perfluorinated compound and reproducing the granular activated carbon (S21) may further include an operation of supplying power from a power supply device.

In a method of selectively removing the perfluorinated compound according to an embodiment of the present invention, the operation of performing the adsorption electrooxidation of the perfluorinated compound and reproducing the granular activated carbon (S21) may be performed with an operation voltage of 7 to 12 V and a current density of 1 to 2.5 $mA/cm^2$. The operation conditions are set to exhibit an optimal effect for the selective and efficient removal of the perfluorinated compound.

The method of selectively removing the perfluorinated compound according to an embodiment of the present invention may exhibit a removal rate of 99% or more with respect to the perfluorinated compound when a relative flow rate of 2,000 times or more is processed with respect to a volume of the granular activated carbon.

In the operation of collecting the secondary treated water (S22), the secondary treated water from which the perfluorinated compound is removed by the adsorption electrooxidation and reproduction of the granular activated carbon (S21) may be collected.

The operations S21 and S22 of FIG. 6 may correspond to the operations S11 and S12 shown in FIG. 5.

The method of selectively removing the perfluorinated compound shown in FIG. 5 may be performed using a device 200 for selectively removing perfluorinated compounds illustrated in FIG. 6. Since the device 200 for selectively removing the perfluorinated compound has been described in detail with reference to FIG. 4 above, a detailed description thereof will be omitted here.

According to a method of selectively removing perfluorinated compounds, it is possible to simultaneously perform the oxidation and decomposition of the perfluorinated compound directly and indirectly through adsorption and electrooxidation, thereby selectively and efficiently removing the perfluorinated compound. In addition, according to the method of selectively removing the perfluorinated compound according to this embodiment, when the SS content of the raw water is high and the pH exceeds the $pH_{PZC}$ of the adsorbent, it is possible to prevent the blockage of the device by the specific pretreatment and to further increase the selectivity and efficiency of the adsorption electrooxidation of the perfluorinated compound. In addition, according to the method of selectively removing the perfluorinated compound, it is possible to selectively treat the perfluorinated compound without the input of a separate chemical, and to delay the breakthrough time and exhibit stable treatment efficiency as the granular activated carbon 32 is continuously reproduced.

Hereinafter, embodiments of the disclosure will be illustrated in more detail by experimental examples. However, the following examples are merely illustrative, and the scope of the present invention is not limited to the following examples.

Example

1. Operation Conditions of Device for Selectively Removing Perfluorinated Compound The treatment efficiency of the perfluorinated compound was evaluated by treating raw water using a device for selectively removing the perfluorinated compound shown in FIG. 1 or 4, according to the pH and SS content of the raw water.

The operation conditions of the device for selectively removing the perfluorinated compound are as follows.

1) Flow rate: 1000 L/hr

2) Volume of the granular activated carbon: 500 L

3) Residence time: 20 min-60 min

4) Power conditions: Operation voltage 7-12V, current density 1-2.5 $mA/cm^2$

5) Electrode: DSA electrode having a multi-electrode structure

6) Conditions of the granular activated carbon

TABLE 4

| Items | Unit | SPEC | Test Results |
|---|---|---|---|
| Granularity | % | 8 × 30 mesh 95 or more | 98.5 |
| Drying loss rate | % | 10 or less | 6.7 |
| Ash | % | — | 3.2 |
| Filled density | g/mℓ | — | 0.48 |
| Iodine adsorption power | mℓ/g | 1000 or more | 1032 |

2. Evaluation of Selective Removal Efficiency of Perfluorinated Compound

A target material of the selectively removed perfluorinated compound was perfluorobutane sulfonic acid (PFBS). A structure of the PFBS is as follows.

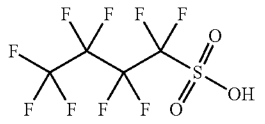 [SMILES: O=S(=O)(O)C(F)(F)C(F)(F)C(F)(F)C(F)(F)F]

The PFBS is similar to other PFASs and is one of the most stable materials, which results from the high thermodynamic stability of the C—F bond and the $F_2CF—SO_3$ bond. As a material that can be substituted for PFOS, PFBS is used in semiconductor industries, paint industries, plating industries, and the like. PFBS is also used for anti-stain agents in carpets, leather, furniture, and vehicles. It is known that the PFBS is a hard-to-decompose material and may not be removed using general chemical and biological treatment methods.

Unlike long chain PFAS, which is usually present by being bound to particulate matter in solution, short chain PFAS such as the PFBS is mostly present in solution, and thus may move a long distance in an aquatic environment. Accordingly, exposure to short chain PFAS in humans is highly possible. In addition, most studies have reported that short chain PFAS species such as PFBS have a slower adsorption rate than that of long chain PFAS species.

Considering these aspects, in this experimental example, the PFBS was set to a target material representing the perfluorinated compound to be removed.

Wastewater discharged from a semiconductor process was treated by a device for selectively removing the perfluorinated compound under the following conditions: a granular activated carbon volume of 500 L, an influent flow rate of 1000 L/hr, an operation voltage of 7 to 12 V, a current of 25 A, and a surface area of the positive electrode of 15,000 $cm^2$. The target perfluorinated compound was PBFS and the removal rate evaluated.

Figure 7A:
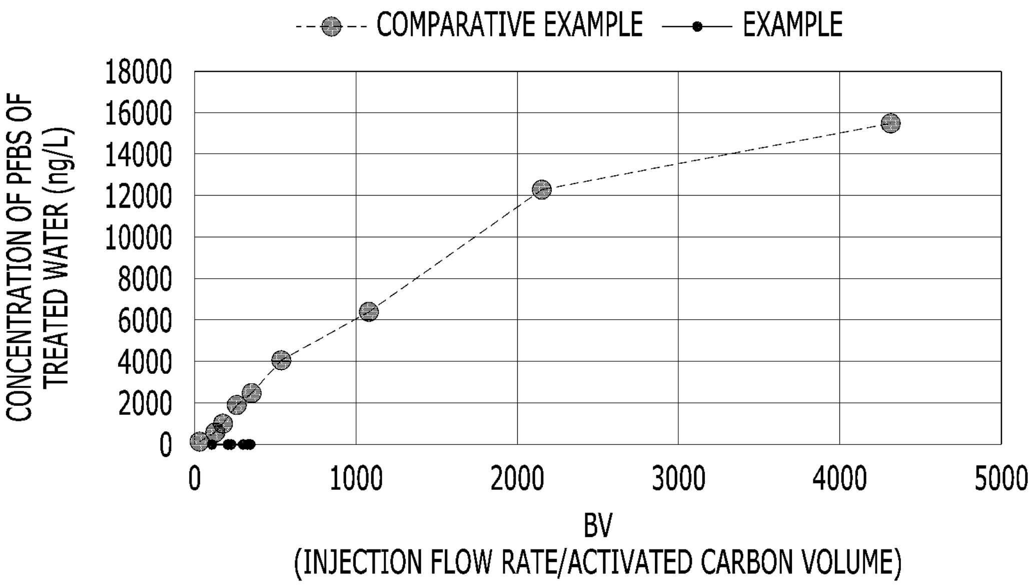
FIG. 7A is a graph illustrating a concentration (ng/L) of PBFS in treated water according to bed volume (BV).
Figure 7B:
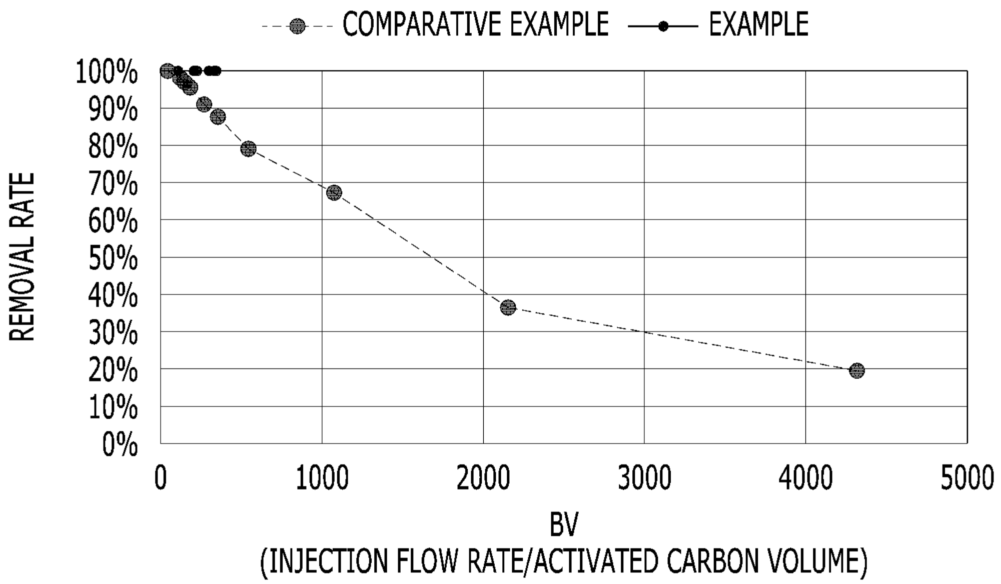
FIG. 7B is a graph illustrating a removal rate (%) of PBFS according to BV.

FIG. 7A is a graph illustrating a concentration (ng/L) of PBFS in treated water according to bed volume (BV). FIG. 7B is a graph illustrating a removal rate (%) of PBFS according to BV. In FIGS. 7A and 7B, a Comparative Example represents a lab test result using a general activated carbon tank commonly used for treating semiconductor wastewater, and the Example represents the results of performing the adsorption electrooxidation process using a device for selectively removing the perfluorinated compound according to an embodiment of the present disclosure. The BV shown in FIGS. 7A and 7B represents an injection flow rate of influent per volume of the activated carbon (injection flow rate/volume of activated carbon), and may refer to a flow rate of influent that may be treated by the activated carbon having the filled volume.

Referring to FIGS. 7A and 7B, in the Comparative Example using only adsorption by the activated carbon, the concentration of the PBFS in the treated water increases as the BV increases, and the removal rate was decreased. On the other hand, in the Example, the removal rate of the PFBS at the BV up to a test time point was 100%.

Thereafter, the operation of the device of the Example was continued to evaluate any changes in the concentration of the PBFS during a long-term operation of the device for selectively removing the perfluorinated compound. About 1,000,000 L or more of influent was treated, which may represent that a relative flow rate of about 2,400 times the volume of 500 L of the granular activated carbon filler. In this long-term operation, the device for selectively removing the perfluorinated compound according to the present embodiment achieved a removal rate of 99% or more with respect to the PFBS, which was the target perfluorinated compound. On the other hand, when the same relative flow rate was treated in the Comparative Example device, the general activated carbon tank only reached a removal rate of about 50% with respect to PFBS, representing an efficiency significantly lower than that of the inventive device.

Accordingly, by using the device and method for selectively removing the perfluorinated compound according to the disclose embodiments, the time lapsed before reaching the breakthrough point of the granular activated carbon during a long-term operation may be much longer when using a device of the Example compared to a device of the Comparative Example, in which a general activated carbon tank is used. As a result, the device for selectively removing the perfluorinated compound according to the present disclosure may extend the life cycle of the granular activated carbon and delay replacement, thereby increasing cost effectiveness and enabling an effective application to large-scale processes.

3. Evaluation for Influence on Characteristics of Influent and on Removal Efficiency of Other Pollutants In the disclosed devices and methods for the selectively removing perfluorinated compounds, the influence on pollutants other than the target perfluorinated compound and on the characteristics of influent was evaluated. Like the above-described Case 2, the wastewater discharged from a semiconductor process was treated by the device for selectively removing the perfluorinated compound under the following conditions: a granular activated carbon volume of 500 L, an influent flow rate of 1000 L/hr, an operating voltage of 7 to 12 V, a current of 25 A, and a surface area of the positive electrode of 15,000 $cm^2$. The following were evaluated.

1) Change in PH
2) Change in electrical conductivity
3) Change in chemical oxygen demand (COD): Evaluated with $COD_{Cr}$
4) Change in concentration of total organic carbon (TOC)
5) Change in concentration of T-N
6) Change in concentration of $NH_3$—N
7) Change in concentration of $NO_3$—N
8) Change in concentration of $SO_4^{2-}$ The evaluation results are shown in FIGS. 8A to 8H.

Figure 8A:
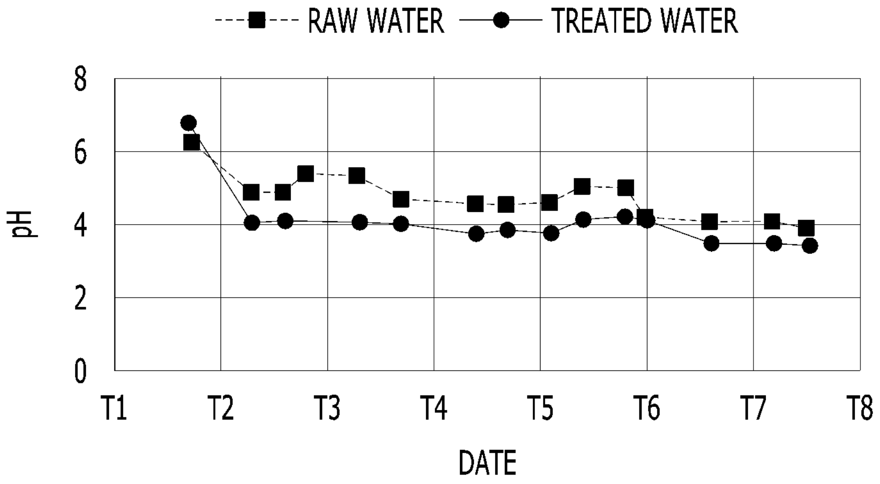
FIG. 8A is a graph showing a change in pH after treatment by a device for selectively removing a perfluorinated compound according to an embodiment of the present disclosure.

FIG. 8A is a graph showing a change in pH after treatment by a device for selectively removing a perfluorinated compound according to an embodiment of the present disclosure. Referring to FIG. 8A, an average pH of the raw water was about 4.8, decreasing to about 4.1 after the treatment using the device and method for selectively removing the perfluorinated compound.

Figure 8B:
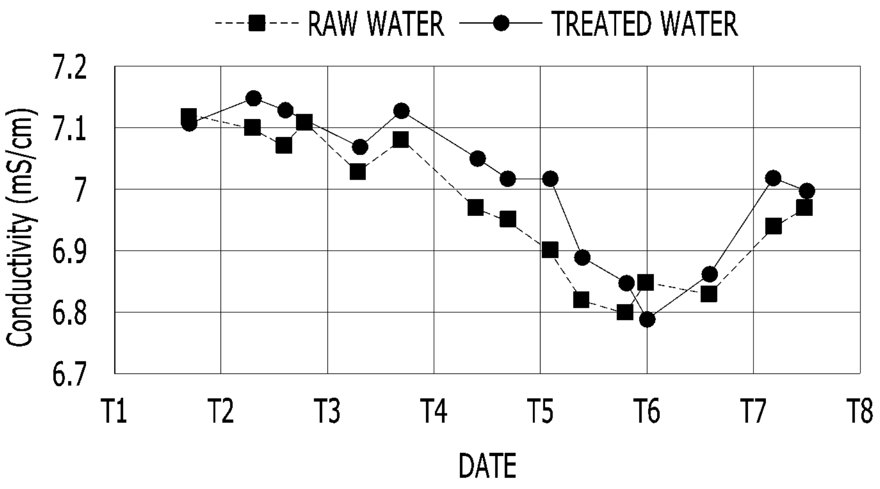
FIG. 8B is a graph showing a change in electrical conductivity after treatment by a device for selectively removing a perfluorinated compound according to the embodiment of the present disclosure.

FIG. 8B is a graph showing a change in electrical conductivity after treatment by a device for selectively removing a perfluorinated compound according to the embodiment of the present disclosure. Referring to FIG. 8B, an average electrical conductivity of the raw water was 7.0 mS/cm, and stayed at 7.0 mS/cm without changing after treatment using the device and method for selectively removing the perfluorinated compound. Accordingly, it can be confirmed that the treatment using the device and method for selectively removing the perfluorinated compound according to the present disclosure does not affect the electrical conductivity of the raw water.

Figure 8C:
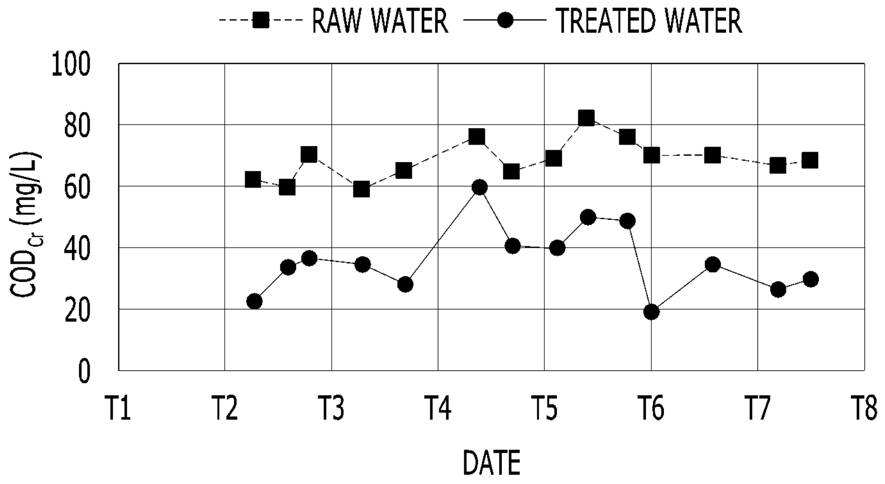
FIG. 8C is a graph showing a change in chemical oxygen demand (COD) after treatment by a device for selectively removing a perfluorinated compound according to an embodiment of the present disclosure.

FIG. 8C is a graph showing a change in chemical oxygen demand (COD) after treatment by a device for selectively removing a perfluorinated compound according to an embodiment of the present disclosure. Referring to FIG. 8C, in the case of $COD_{Cr}$, an average concentration in the raw water was 69 mg/L, but decreased to about 36 mg/L after the treatment using the device and method for selectively removing the perfluorinated compound. Accordingly, it can be confirmed that the treatment using the device and method for selectively removing the perfluorinated compound results in a decrease in the COD as well as exhibiting high selectivity and efficiency for the removal of the perfluorinated compound.

Figure 8D:
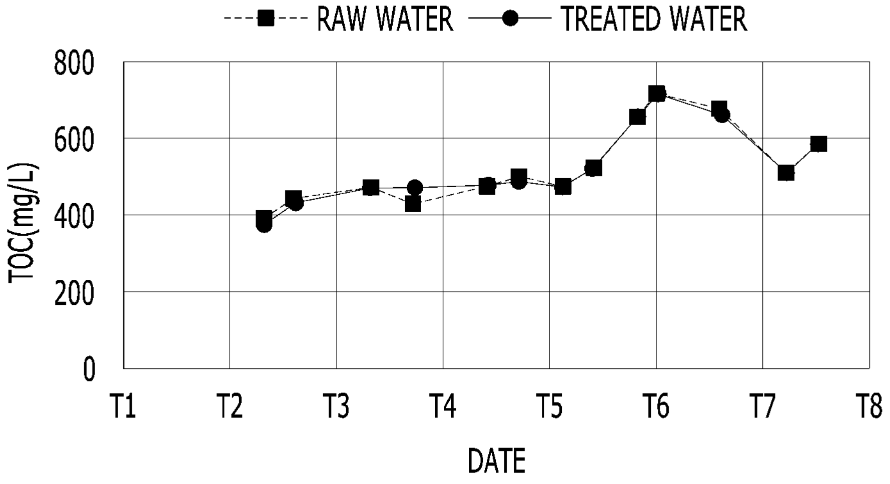
FIG. 8D is a view showing a change in a concentration of total organic carbon (TOC) after treatment by a device for selectively removing a perfluorinated compound according to an embodiment of the present disclosure.

FIG. 8D is a view showing a change in a concentration of total organic carbon (TOC) after treatment by a device for selectively removing a perfluorinated compound according to an embodiment of the present disclosure. Referring to FIG. 8D, in the case of TOC, the concentrations in the raw water and the treated water were about 531 mg/L, but were hardly affected by the treatment using the device and method for selectively removing the perfluorinated compound.

Figure 8E:
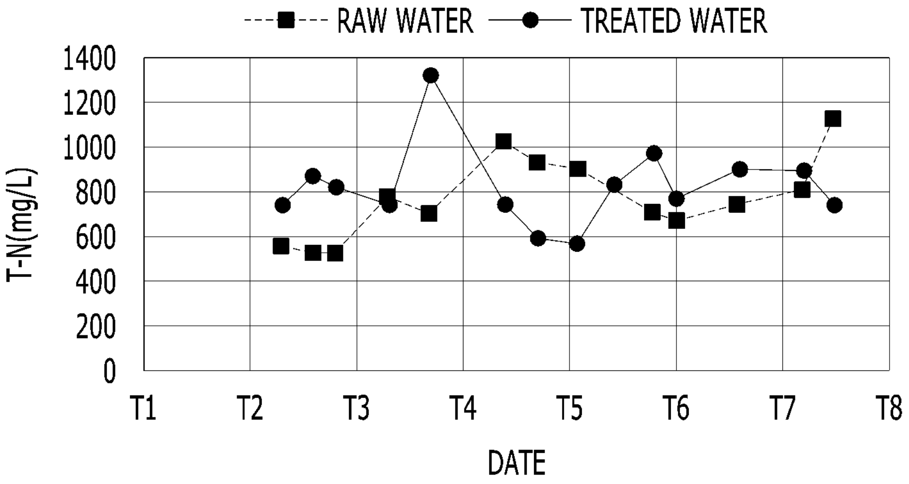
FIG. 8E is a graph showing a change in a concentration of T-N after treatment by a device for selectively removing a perfluorinated compound according to an embodiment of the present disclosure.

FIG. 8E is a graph showing a change in a concentration of T-N after treatment by a device for selectively removing a perfluorinated compound according to an embodiment of the present disclosure. Referring to FIG. 8E, T-N reflects an average concentration in the raw water of about 771 mg/L, which increased to about 826 mg/L after the treatment using the device and method for selectively removing the perfluorinated compound.

Figure 8F:
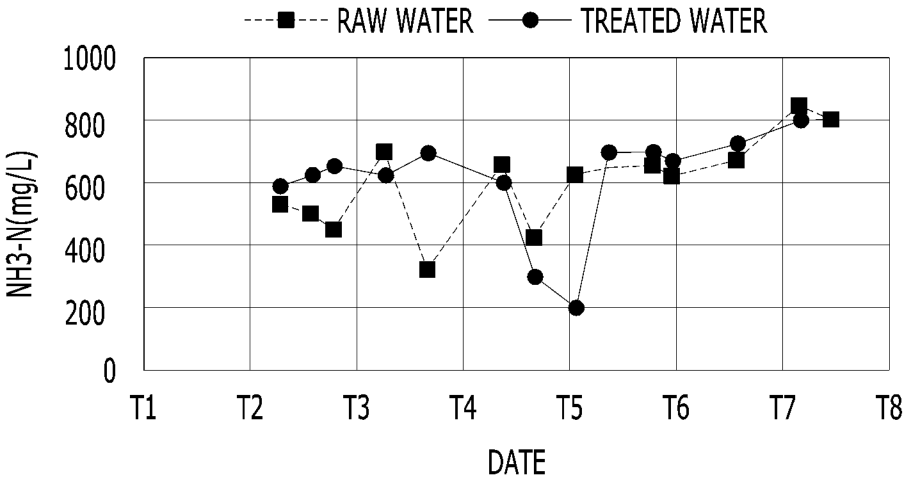
FIG. 8F is a graph showing a change in a concentration of $NH_3$—N after treatment by a device for selectively removing a perfluorinated compound according to an embodiment of the present disclosure.

FIG. 8F is a graph showing a change in a concentration of $NH_3$—N after treatment by a device for selectively removing a perfluorinated compound according to an embodiment of the present disclosure. Referring to FIG. 8F, $NH_3$—N reflected an average concentration in the raw water of about 604 mg/L, which increased to about 621 mg/L after the treatment using the device and method for selectively removing the perfluorinated compound. The change in the concentration of $NH_3$—N shows a pattern similar to that of T-N shown in FIG. 8E, which may be because most of the T-N-inducing materials are composed of $NH_3$—N.

Figure 8G:
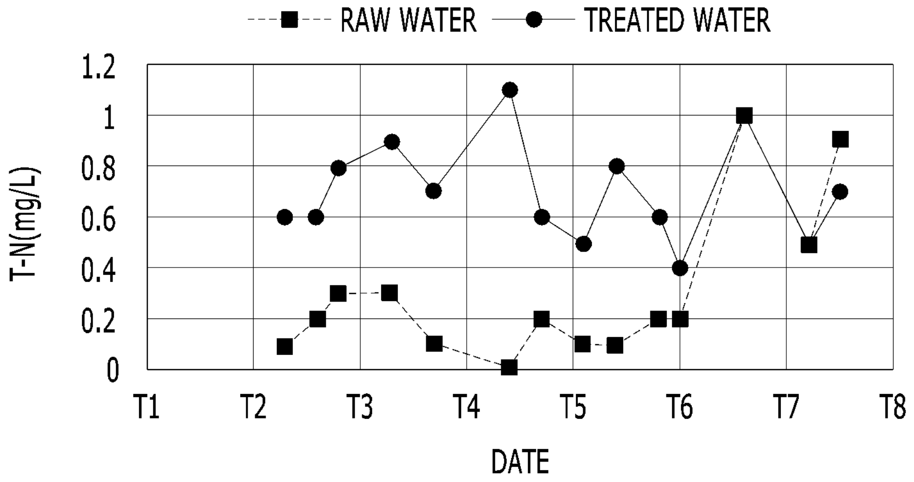
FIG. 8G is a graph showing a change in a concentration of $NO_3$—N after treatment by a device for selectively removing a perfluorinated compound according to an embodiment of the present disclosure.

FIG. 8G is a graph showing a change in a concentration of $NO_3$—N after treatment by a device for selectively removing a perfluorinated compound according to an embodiment of the present disclosure. Referring to FIG. 8G, in the case of $NO_3$—N, a specific gravity of the total nitrogen was very low, an average concentration in the raw water was 0.3 mg/L, and some was removed after the treatment using the device and method for selectively removing the perfluorinated compound, but it was determined that the influence on the change in the total nitrogen concentration was insignificant.

Figure 8H:
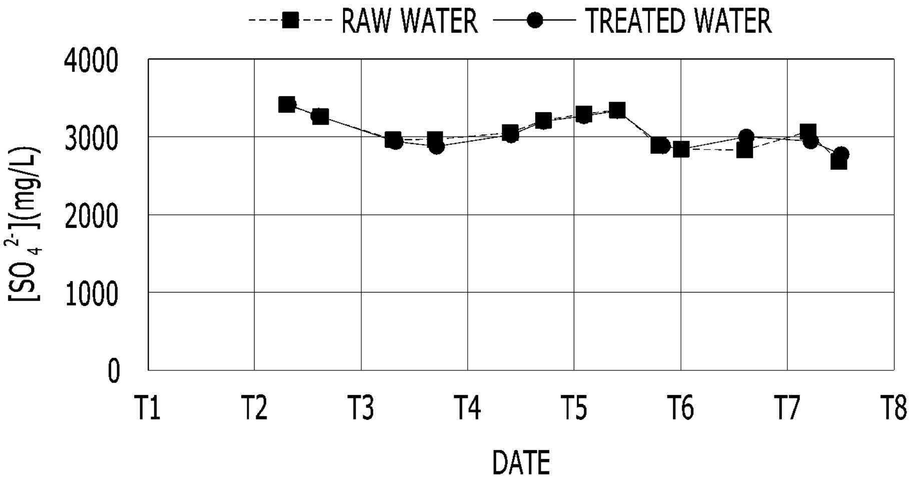
FIG. 8H is a graph showing a change in a concentration of $SO_4^{2-}$ after treatment by a device for selectively removing a perfluorinated compound according to an embodiment of the present disclosure.

FIG. 8H is a graph showing a change in a concentration of $SO_4^{2-}$ after treatment by a device for selectively removing a perfluorinated compound according to an embodiment of the present disclosure. Referring to FIG. 8H, in the case of $SO_4^{2-}$, an average concentration in the raw water was 3053 mg/L, which slightly increased to 3064 mg/L after the treatment using the device and method for selectively removing the perfluorinated compound.

As a result of analyzing the reduction efficiency of general pollutants and other characteristics, such as pH, electrical conductivity, COD, TOC, T-N, $NH_3$—N, $NO_3$—N, and $SO_4^{2-}$ that result from treatment using a device and method for selectively removing perfluorinated compounds according to embodiments of the disclosure, as shown in FIGS. 8A to 8H, it was difficult to confirm the removal pattern of general pollutants other than COD.

From the above-described experimental results, it can be confirmed that the devices and methods for selectively removing the perfluorinated compound disclosed herein may remove the perfluorinated compounds with very high selectivity and high efficiency compared to other pollutants. In addition, it can be confirmed that the devices and methods for selectively removing the perfluorinated compounds can maintain a high removal performance compared to use of general activated carbon adsorption when the same relative flow rate used in a long-term operation. As a result, it is possible to extend the amount of operational time before reaching the breakthrough point, thereby further increasing the cost efficiency.

Although the technical spirit of the present invention has been specifically recorded according to some preferred embodiments, it should be noted that the above-described embodiments are to describe the present invention and do not to limit the present invention. In addition, those skilled in the art will be able to understand that various embodiments are possible within the scope of the technical spirit of the present invention.

What is claimed is:

1. A method of selectively removing a perfluorinated compound, the method comprising:

oxidizing and decomposing a perfluorinated compound contained in raw water through adsorption and electrooxidation in an adsorption electrooxidation tank that includes a reaction unit having a plurality of electrodes that are spaced apart and granular activated carbon disposed to fill spaces between the spaced-apart electrodes; and adjusting the raw water level within the reaction unit at a height greater than or equal to a reaction height of the electrodes using a head adjustment pipe unit during the electrooxidation, wherein the reaction height of the electrode is the vertical extent of the electrode which is immersed in the raw water within the reaction unit during electrooxidation.

2. The method of claim 1, wherein the raw water has a pH that is smaller than an isoelectric point $pH_{PZC}$ of the granular activated carbon and has a suspended solid (SS) content that is smaller than 500 mg/L.

3. The method of claim 1, wherein the method is performed with an operation voltage of 7 to 12 V and a current density of 1 to 2.5 $mA/cm^2$.

4. The method of claim 1, wherein a removal rate of the perfluorinated compound from the raw water is 99% or more when a relative flow rate of the raw water is 2,000 times or more with respect to a volume of the granular activated carbon.

5. The method of claim 1, further comprising:

introducing the raw water into the reaction unit by an inflow pipe disposed above the reaction unit; and discharging treated water whose reaction has been completed in the reaction unit by an outflow pipe disposed under the reaction unit.

6. The method of claim 5, wherein the head adjustment pipe unit includes a first portion and a second portion, wherein the first portion is vertically disposed, has a lower end connected orthogonally to the outflow pipe, and includes a valve that allows air to pass therethrough from an upper end of the first portion, and wherein the raw water level within the reaction unit is maintained using atmospheric pressure by opening the valve of the first portion while the adsorption electrooxidation tank is operated.

7. The method of claim 6, wherein the maintaining of the raw water level within the reaction unit includes maintaining a height of the head adjustment pipe unit at a height greater than or equal to a height of the adsorption electrooxidation tank.

8. The method of claim 6, wherein the second portion has a bent shape, and has one end connected orthogonally to the first portion at a predetermined height, and the other end disposed at the same level as the outflow pipe, and wherein the maintaining of the raw water level within the reaction unit includes maintaining a height of the second portion of the head adjustment pipe unit at a height that is greater than or equal to a height of the reaction unit and smaller than or equal to a height of the inflow pipe.

9. The method of claim 1, wherein the electrodes include a dimensionally stable anode (DSA) electrode.

10. The method of claim 1, further comprising a separator disposed between the electrodes.

11. The method of claim 1, wherein the granular activated carbon has a size of 4 to 30 meshes, an isoelectric point $pH_{PZC}$ of 4 to 10, a specific surface area of 650 to 1500 $m^2/g$, and a filled density of 0.35 to 0.55 g/cc.

12. The method of claim 1, wherein the granular activated carbon is polarized by an electric field to form microelectrodes, and oxidation and decomposition of the perfluorinated compound adsorbed to a surface of each granular activated carbon are performed.

13. The method of claim 1, wherein the granular activated carbon is reproduced during the oxidation and decomposition of the perfluorinated compound.

14. The method of claim 1, further comprising: pre-treating raw water, wherein the pre-treating includes one or more selected from coagulating solids contained in the raw water;

precipitating agglomerated agglomerates;

filtering the precipitated agglomerates; and adjusting a pH of filtered primary treated water.

15. The method of claim 14, wherein the raw water has a pH that exceeds an isoelectric point $pH_{PZC}$ of the granular activated carbon and has a suspended solid (SS) content exceeding 500 mg/L.

16. A method of selectively removing a perfluorinated compound, the method comprising:

oxidizing and decomposing a perfluorinated compound contained in raw water through adsorption and electrooxidation in an adsorption electrooxidation tank including a reaction unit comprising DSA (dimensionally stable anode) electrodes spaced apart and having a multi-electrode structure in which an anode and a cathode are disposed, and granular activated carbon disposed to fill spaces between the spaced-apart DSA electrodes; and adjusting the raw water level within the reaction unit at a height greater than or equal to a reaction height of the DSA electrodes using a head adjustment device during the electrooxidation, wherein the reaction height of the DSA electrode is the vertical extent of the DSA electrode that is immersed in the raw water within the reaction unit during electrooxidation.

17. The method of claim 16, wherein the perfluorinated compound includes a compound having a perfluoro (—CnF2n+1) tail in which hydrogen atoms in a hydrocarbon backbone are replaced with fluorine atoms.

18. The method of claim 16, wherein the method is applied to raw water having a pH lower than an isoelectric point (pHPZC) of the granular activated carbon and a suspended solid (SS) content of smaller than 500 mg/L.

19. The method of claim 16, wherein the method is performed under operating conditions having an operating voltage of 7 to 12 V.

20. The method of claim 16, further comprising:

introducing the raw water into the reaction unit through an inflow pipe disposed above the reaction unit; and discharging treated water that has completed reaction from the reaction unit through an outflow pipe disposed under the reaction unit.

21. The method of claim 20, wherein the head adjustment device includes a first portion and a second portion, wherein the first portion is disposed to allow fluid communication with the outflow pipe, has a lower end connected to the outflow pipe, and includes a valve at an upper end that allows air to pass through, and wherein, during operation of the adsorption electrooxidation tank, the valve of the first portion is opened to maintain the raw water level within the reaction unit using atmospheric pressure.

22. The method of claim 21, wherein the maintaining the water level within the reaction unit includes maintaining a height of the head adjustment device to be greater than or equal to a height of the adsorption electrooxidation tank.

23. The method of claim 21, wherein the second portion has a bent shape, one end is connected to the first portion at a predetermined height, and the other end is disposed at the same level as the outflow pipe, and the maintaining the raw water level within the reaction unit includes maintaining a height of the second portion of the head adjustment device at a level greater than or equal to the height of the reaction unit and less than or equal to the height of the inflow pipe.

24. The method of claim 16, further comprising a separator disposed between the DSA electrodes.

25. The method of claim 16, wherein the granular activated carbon has a size of 4 to 30 meshes and an isoelectric point (pHPZC) of 4 to 10.

26. The method of claim 16, wherein the granular activated carbon is polarized by an electric field to form microelectrodes, and oxidation and decomposition of the perfluorinated compound adsorbed to a surface of each granular activated carbon are performed.

27. The method of claim 16, wherein the granular activated carbon is regenerated concurrently with the oxidation and decomposition of the perfluorinated compound by performing oxidation and decomposition through adsorption and electrooxidation.

28. The method of claim 16, wherein the method is applied to raw water having a pH lower than an isoelectric point (pHPZC) of the granular activated carbon and a suspended solid (SS) content of exceeding 500 mg/L.

29. A method of selectively removing a perfluorinated compound, the method comprising:

pre-treating raw water before adsorption and electrooxidation;

oxidizing and decomposing a perfluorinated compound contained in the pre-treated raw water through adsorption and electrooxidation in an adsorption electrooxidation tank including a reaction unit comprising DSA (dimensionally stable anode) electrodes spaced apart and having a multi-electrode structure in which an anode and a cathode are disposed, and granular activated carbon disposed to fill spaces between the DSA electrodes; and adjusting the pre-treated raw water level within the reaction unit at a height greater than or equal to a reaction height of the DSA electrodes using a head adjustment device during the electrooxidation, wherein the reaction height of the DSA electrode is the vertical extent of the DSA electrode which is immersed in the pre-treated raw water within the reaction unit during electrooxidation.

30. The method of claim 29, wherein the pre-treating includes one or more selected from:

a coagulation step for coagulating solids contained in the raw water;

a solid-liquid separation step for separating coagulated flocs from liquid;

a filtration step for filtering precipitate flocs; and a pH adjustment step for adjusting a pH of filtered primary treated water.

31. The method of claim 30, wherein, in the coagulation step, suspended solids (SS) contained in the raw water are aggregated to prevent clogging of the adsorption electrooxidation tank.

32. The method of claim 30, wherein the coagulation step is performed using a coagulant including a metal-based coagulant, a polymer coagulant, or a combination thereof.

33. The method of claim 30, wherein the pre-treating includes a solid-liquid separation step for separating the coagulated flocs from the liquid, and wherein the solid-liquid separation step is performed by separating suspended solids (SS) from the liquid using one or more methods selected from the group consisting of a precipitation tank, inclined plate, and ceramic filter.

34. The method of claim 30, wherein the pre-treating includes a solid-liquid separation step for separating the coagulated flocs from the liquid, and wherein in the pH adjustment step, the pH of the primary treated water is adjusted to a range of pH 6.5 to 8.

* * * * *